UNITED STATES PATENT OFFICE.

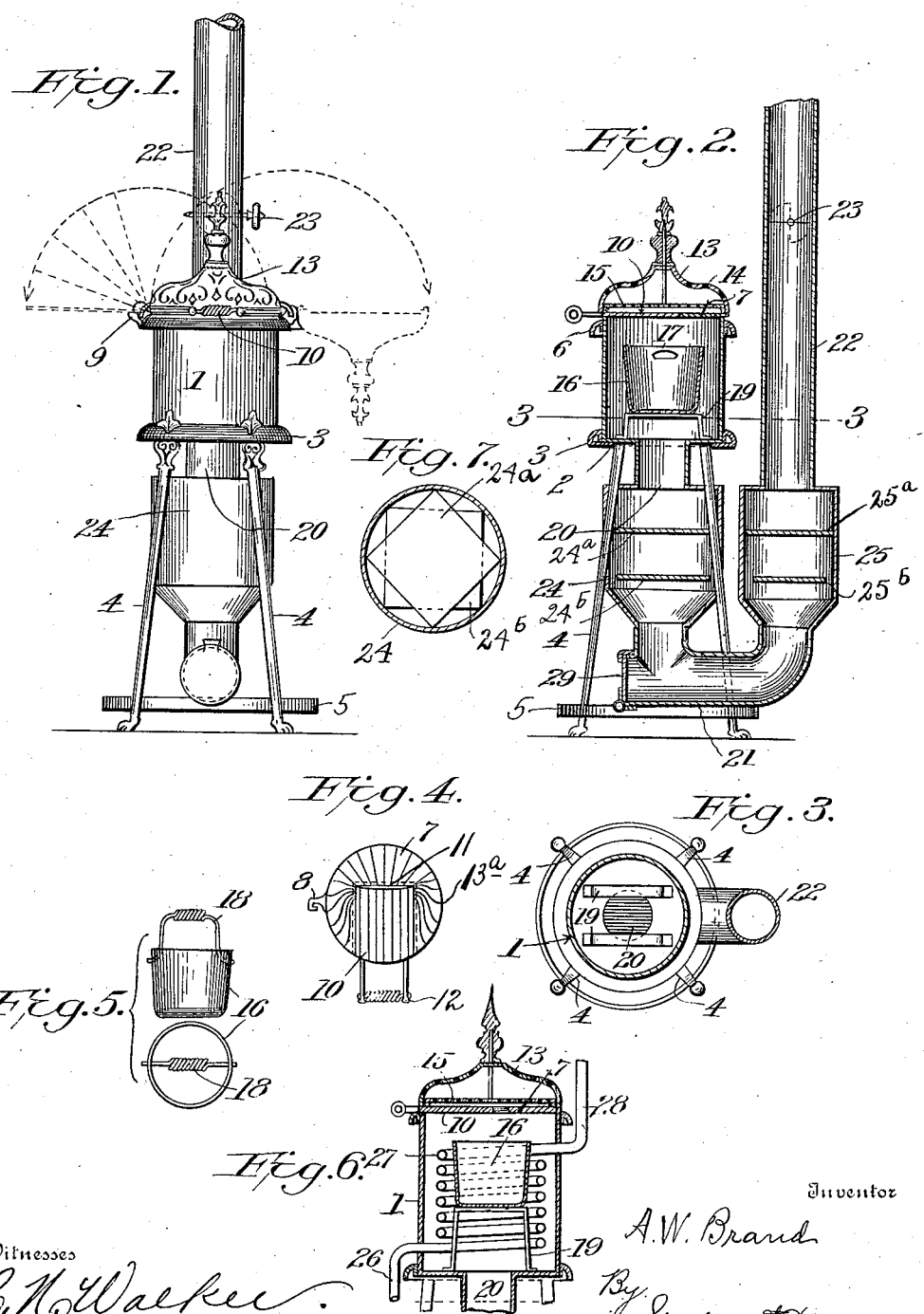

ACHILL WALTER BRAND, OF BOISE, IDAHO.

FUEL-CONSUMER, HEAT-GENERATOR, AND HEATER.

1,015,665.  Specification of Letters Patent.  Patented Jan. 23, 1912.

Application filed March 16, 1908. Serial No. 421,295.

*To all whom it may concern:*

Be it known that I, ACHILL WALTER BRAND, a citizen of the United States, residing at Boise, in the county of Ada, State of Idaho, have invented certain new and useful Improvements in Fuel-Consumers, Heat-Generators, and Heaters, of which the following is a description, reference being had to the accompanying drawing and to the letters and figures of reference marked thereon.

My invention relates to new and useful improvements in fuel consumers and heat generators, and has for its object to provide a fuel-consuming chamber with an arrangement of drafts whereby air is delivered to the fuel in a downward direction on top of said fuel. By this arrangement of parts, I secure a device wherein the heat is more quickly and evenly generated by a more economical and complete combustion of the fuel, leaving nothing but one compact clinker.

A still further object of my invention is to provide a heater with a water coil which encircles the combustion chamber and lies directly in the path of the hot gases passing from said chamber.

A further object of my invention is to provide a combustion chamber which is closed at the bottom, and which is located in a surrounding drum or casing having a draft opening directly above the combustion chamber.

Further objects of my invention will in part be obvious, and in part be hereinafter more fully described.

In the drawing which shows by way of illustration one embodiment of my invention,—Figure 1 is a front elevation of a heating device embodying my improvements; Fig. 2 is a longitudinal sectional view of the same; Fig. 3 is a transverse view on the line 3—3 of Fig. 2; Fig. 4 is a detail view of the lid with the draft slide therein; Fig. 5 is a detail view and side elevation in plan, of the combustion chamber, showing a handle for lifting the same; Fig. 6 is a sectional view showing a modified form of construction; and Fig. 7 is a detail in section, showing my drum with distributers.

A body portion 1 of my heater is preferably cylindrical in shape, and provided at the bottom with a base portion 2 and a strengthening flange 3. Legs 4, 4, are secured to the bottom of the casing; and, as shown in the drawing, are of considerable length. Said legs are connected near the lower end by a supporting base or shelf 5. A strengthening rim or flange 6 is secured to the casing or drum near its upper end. A lid 7, preferably of the same size as the casing or drum 1 is used for closing the upper end of said casing. Said lid is provided with a projecting hooked-shaped arm 8, which engages a lug 9 carried by the casing or drum 1. Said arm and lug are of the usual construction, so as to allow the lid to be turned over, as shown in dotted lines in Fig. 1.

The lid 7 is provided with a slide 10, which is guided in suitable undercut ways formed in said lid as indicated in dotted lines in Fig. 4, so that the upper surface of said lid and said slide lie substantially in the same plane. The inner edge of the slide 10 is preferably curved as at 11, so as to form a slight opening through the lid when said slide is in its closed position. Said slide is also provided with a handle 12, for the purpose of operating the same. The upper surface of the slide 10 and the lid is corrugated or grooved, as shown at 13$^a$ in Fig. 4. The purpose of said corrugations will be hereinafter more fully described.

The heater is provided with a cover 13, which, as shown in the drawing, is curved in outline and provided with suitable openings 14. The inner portion 15 of said cover is also perforated, so as to allow currents of air to pass down through the openings in the cover, when desired.

Within the casing or drum 1 is located the combustion chamber 16, which, as shown in Figs. 2 and 5, is in the form of a receptacle, having a closed bottom. Said combustion chamber or receptacle, as shown in Fig. 2, is provided with an opening 17, whereby said chamber may be lifted from the casing or drum. In Fig. 5 I have shown my combustion chamber as provided with a handle 18 for lifting the same.

Suitable brackets 19, 19, are secured to the bottom portion 2 of the casing, and provide suitable means for supporting the combustion chamber 16, so that the same is held in a central position in the casing or drum 1. A pipe 20 is secured to the bottom portion 2 of the casing, and extends directly downward to a position adjacent the lower end of the supporting legs. A horizontal pipe 21 is joined to the pipe 20 at its lower end, and said horizontal pipe 21 connects with the vertical pipe 22, which leads to the chimney. A suitable damper 23 may be located in said pipe 22. In order to increase the heat radiating capacity of the pipes 20 and 22, I have enlarged the same to the suitable sized drums, with two inside heat distributers 24$^a$, 24$^b$ and 25$^a$, 25$^b$, throwing all passing heat to the extreme periphery of the drums. As shown in Fig. 7, said distributers each consist of a rectangular plate arranged as shown in said figure.

In some instances I may provide my heater with a water coil, which, as shown in Fig. 6, consists of a pipe 26, leading through the casing, and then leading in coils 27 about the supporting bracket for the fuel pot or combustion chamber, and then out through the side of the casing and upward, as shown at 28. A hinged cover 29 is secured to the end of the pipe 21, whereby access may be had thereto, for the purpose of cleaning the flues.

In operation, the fuel pot or combustion chamber is provided with suitable fuel, and is then placed in the casing or drum of the heater. After lighting said fuel, the slide 10 is slightly opened, which allows a current of air to pass down through said opening on to the fuel in the combustion chamber. As the fuel burns, the hot gases passing therefrom lead up over the top of the fuel pot, and down around the same, and into the flue or pipe 20, and thence through the pipes 21 and 22 to the chimney. By this arrangement of parts, it will be seen that the hot gases pass in a downward direction from the fuel pot to the bottom of the heater, and as the heater is mounted on long legs, I secure a very great length of heat radiating surface. When the slide is closed, there is still a slight opening for sufficient draft to keep the fire from dying.

By corrugating the upper surface of the slide, cooking utensils may be placed thereon without interfering with the draft. That is to say, the air currents will pass through the corrugations or grooves in the upper surface of the lid and down through the opening formed between the end of the slide and the lid. It will be obvious that said slide may be moved to various positions, so as to regulate the draft for the fuel. It will be noted from Fig. 1, that when the cover is turned into the position shown in dotted lines, the same forms a rigid shelf, and leaves the top of the stove free for cooking purposes, if desired.

The invention in its broader aspects is not limited to details of construction herein shown, nor to any particular form of construction, as changes may be made therein without departing from the main principle of the invention, and without sacrificing its chief advantages.

Having thus described my invention, what I claim as new and desire to secure by Letters Patent, is:—

1. A heater including in combination, a casing, brackets secured to the lower end thereof and within said casing, a removable fuel pot adapted to rest on said brackets, said fuel pot having closed sides and bottom, a lid located in the casing above the fuel pot having an adjustable opening for directing a draft in a downward direction on the fuel in the fuel pot, a pipe leading from the bottom portion of said casing.

2. A heater including in combination, a casing having an opening located centrally in the bottom thereof, brackets secured within said casing adjacent the opening in the bottom, a removable fuel pot adapted to rest on said brackets, said fuel pot having closed sides and bottom, a vertical pipe leading downward from the opening in said bottom of the casing, means for supporting the casing, a lid for closing the top of the casing, said lid having an adjustable opening for directing a draft in a downward direction on the fuel in said fuel pot.

3. A heater including in combination, a casing, a combustion chamber located therein, a lid or top for closing the upper end of said casing and having an opening therein, a slide for closing said opening, the inner end of said slide being curved, whereby when said slide is closed a slight opening is left between the same and said lid.

4. A heater including in combination, a casing, having an opening in the bottom thereof, a pipe leading from said opening, brackets secured within the casing, a fuel pot carried by said brackets, a lid for closing the upper end of the casing having an opening therein, a slide for closing said opening, the inner end of said slide being curved, whereby when said slide is closed, a slight opening is left between the same and said lid.

5. A heater including in combination, a casing, a fuel pot located in said casing, said fuel pot having a closed bottom and closed sides adjacent said bottom, means for directing a draft in a downward direction upon the fuel in said pot, and a water coil surrounding said fuel pot.

6. A heater including in combination, a casing, brackets mounted in said casing, a pipe leading from the lower end of said casing, a fuel pot supported on said brackets, a lid for closing said casing, said lid having an opening therein, and means for adjusting the size of said opening, and a pipe entering said casing and coiled about said brackets and said fuel pot.

7. A heater including in combination, a casing, a combustion chamber located therein, a lid or top for closing the upper end of said casing, said lid or top having an opening therein, a slide for closing said opening, the inner end of said slide being curved, whereby when said slide is closed a slight space is left between the same and said lid, said lid and said slide having grooves or corrugations formed in the upper face thereof and leading to the space between the slide and the lid.

In testimony whereof I affix my signature, in presence of two witnesses.

ACHILL WALTER BRAND.

Witnesses:
 CHARLES L. STEWART,
 L. D. ALLRED.

Copies of this patent may be obtained for five cents each, by addressing the "Commissioner of Patents, Washington, D. C."